United States Patent [19]
Smith et al.

[11] 3,815,047
[45] June 4, 1974

[54] TRANSVERSELY-EXCITED WAVEGUIDE GAS LASER

[75] Inventors: Peter William Smith, Colts Neck; Obert Reeves Wood, II, Matawan, both of N.J.

[73] Assignee: Bell Telephone Laboratories, Incorporated, Murray Hill, N.J.

[22] Filed: Feb. 14, 1973

[21] Appl. No.: 332,277

[52] U.S. Cl. ..................... 331/94.5 R, 330/4.3
[51] Int. Cl. .............................................. H01s 3/09
[58] Field of Search ..................... 331/94.5; 330/4.3

[56] References Cited
UNITED STATES PATENTS

| | | | |
|---|---|---|---|
| 3,386,043 | 5/1968 | Marcatili et al. | 331/94.5 |
| 3,577,096 | 5/1971 | Bridges et al. | 331/94.5 |
| 3,571,745 | 3/1971 | Altman et al. | 331/94.5 |
| 3,753,152 | 8/1973 | Pettipiece | 331/94.5 |
| 3,757,248 | 9/1973 | Small | 331/94.5 |
| 3,772,611 | 11/1973 | Smith | 331/94.5 |

*Primary Examiner*—William L. Sikes
*Attorney, Agent, or Firm*—Wilford L. Wisner

[57] ABSTRACT

There are disclosed various configurations for waveguide gas lasers operating at high total gas pressures to enable a broad tuning band and with a transverse excitation structure that reduces the threshold and waste heat generation of the laser. This structure typically includes a smooth base anode and cathode squares plated on a dielectric that forms an opposed wall of the waveguiding structure. Multiple gas inlets and outlets are also preferably provided along the bore; and the pulse-forming capacitors can be formed integrally with the cathodes by plating a common electrode over the dielectric support of the cathodes. Optionally, the anode may be cooled thermoelectrically because of the small heat generation per unit length. A variety of pre-ionization techniques, including a multiplicity of plasma-jets, are also disclosed.

10 Claims, 9 Drawing Figures

TOP VIEW

TOP VIEW 3,815,047

TRANSVERSELY-EXCITED WAVEGUIDE GAS LASER

BACKGROUND OF THE INVENTION

This invention relates to gas lasers of the transversely excited type.

There have been two very interesting developments in the gas laser art recently. In one of these developments gas laser operation has been moved to higher and higher total pressures, even to atmospheric pressure and above, by the transverse discharge technique. The length of the discharge from anode to cathode is greatly reduced; and the gas may be more easily broken down. In general, high gas pressures broaden the tuning band of the gas laser and provide a higher power generation per unit of volume together with other interesting operation characteristics.

The other type of gas laser developed recently is the type in which the laser radiation is waveguided within the gas by a sort of specular reflection from the tube walls. This mode of operation was first proposed by E. A. J. Marcatili and R. A. Schmeltzer, for example, in their U.S. Pat. No. 3,386,043. In general, the Fresnel number of such a laser must be very high because of the small volume of active medium; and extended length in relation to the tube diameter is generally desirable. A waveguide laser has internal transverse dimensions typically smaller than those of conventional gas lasers or of any known transverse discharge lasers.

SUMMARY OF THE INVENTION

According to our invention, we recognize that it would be desirable to combine the best features of transverse discharge gas lasers and waveguide gas lasers.

To that end, a transversely-excited waveguide gas laser according to our invention is provided which operates at high pressures and with a broad tuning band in which the transverse-excitation electrodes themselves form a part of the capillary waveguiding structure.

According to various specific features of our invention, the combination of the two prior types of gas lasers enables the implementation of several advance techniques not heretofore applied to gas lasers, such as thermoelectric cooling of the longitudinally extending anode, integrated pulse-forming capacitor structures in which the cathodes form part of the electrodes and new techniques of pre-ionization of the gas mixture and provision of uniform excitation without arcing.

BRIEF DESCRIPTION OF THE DRAWING

Further features and advantages of the invention will become apparent from the following detailed description taken together with the drawing in which.

DESCRIPTION OF ILLUSTRATIVE EMBODIMENT

Figure 1:
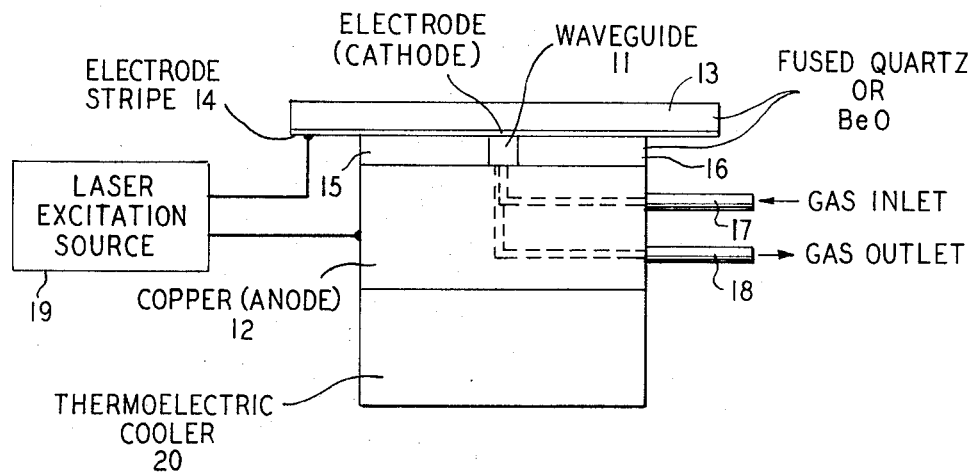
FIG. 1 is a partially pictorial and partially block diagrammatic illustration of a preferred embodiment of the invention.

FIG. 1 shows the first known device in which laser action has been obtained in a gas mixture in a waveguide in which a transverse discharge is present. The waveguide 11 contained a mixture of carbon dioxide, nitrogen and helium in a rectangular cross-section bore or structure formed by a copper base anode 12, the opposed dielectric top plate 13 on the underside of which the cathode electrode stripes 14 are plated, and by the sidewalls comprising dielectric plates 15 and 16. Two channels were provided through the base anode 12; one of them was the gas inlet 17 and the other the gas outlet 18, both of which entered the waveguide 11 directly below the central axis of waveguide 11. A pulsed dc discharge was provided between the base anode 12 and a plurality of electrode stripes 14, which are directly behind one another in a plane orthogonal to the projection plane of FIG. 1. This discharge was provided by an excitation source 19 which is shown in more detail in FIG. 2 and described hereinafter.

The sole additional element illustrated in FIG. 1 is a thermoelectric cooling apparatus 20 which is diagrammatically shown below and in contact with a major surface of anode 12. In more detail cooling apparatus 20 comprises a series of thermoelectric junctions of alternating type mounted in a repetitive series along that surface of anode 12. Semiconductive thermoelectric junctions of a suitable type are now well known and will not be described further. The same junctions will provide either heating or cooling, depending upon the direction of current flow through the series combination from a suitable current source connected to them. Such thermoelectric cooling is feasible for the waveguide gas laser because of its low heat generation per unit length and compact construction.

While in our original experimental embodiment in which laser action was obtained at 10.6 micrometers the dielectric members 13, 15 and 16 were fused quartz, greater heat conductivity could be obtained by substituting therefor beryllia (BeO).

Figure 2:
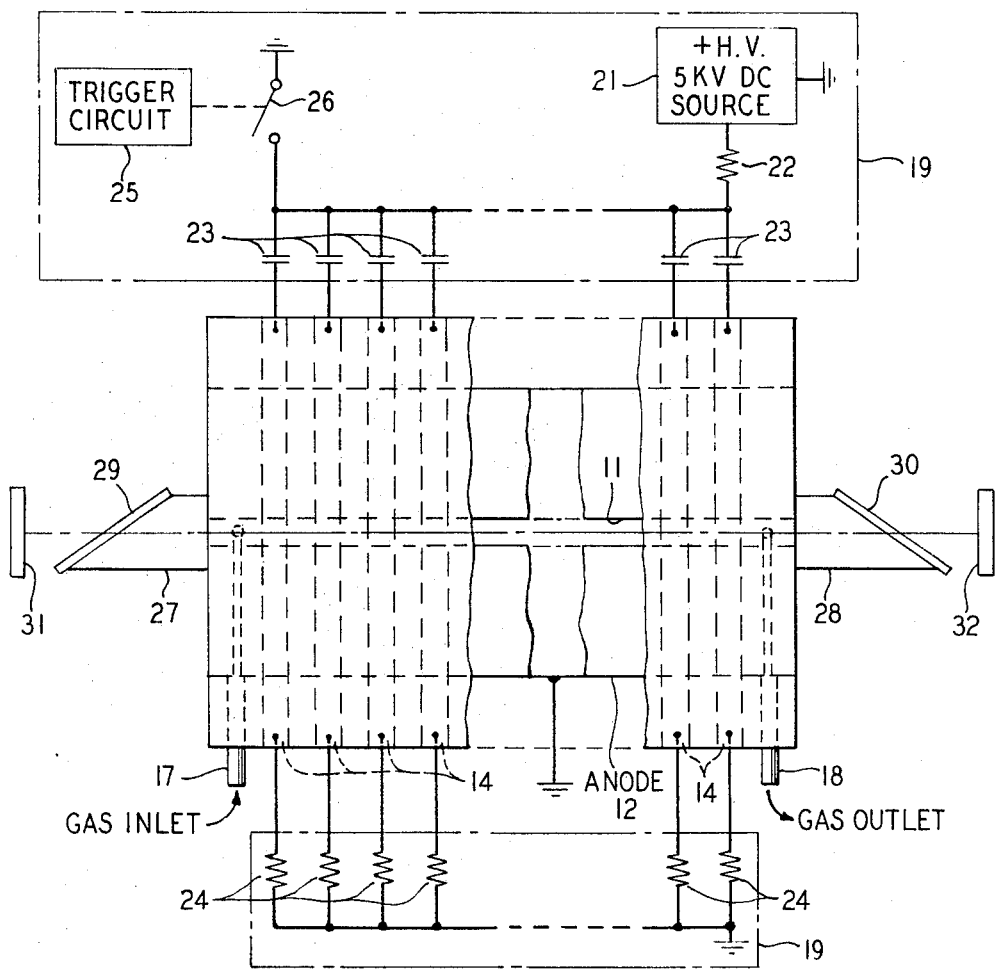
FIG. 2 shows a plan view of the embodiment of FIG. 1.

In FIG. 2 there is shown a plan view of our original experimental embodiment and also there is shown in more detail the excitation source 19. Each of the cathode electrode stripes 14 can now be seen to be equally spaced from the others along the waveguide axis and to lie in a direction orthogonal to the laser axis. A direct current voltage illustratively 5 kilovolts is supplied from a source 21 through a charging resistor 22 to charge all of the capacitors 23, each of which has one terminal connected to a corresponding one of electrode stripes 14. The other terminals are connected in common through resistor 22 to source 21. The circuit through high voltage source 21 is completed via the reference point indicated as ground by means of resistors 24 each of which is connected to a corresponding one of cathode stripes 14. In order to produce a certain change in the voltage across the gaseous medium of the waveguide 11 a trigger circuit 25 closes a switch 26 which is illustratively electromagnetic but is preferably a solid state switch. When switch 26 is closed, the common terminals of capacitor 23 are suddenly placed at ground potential. These previously fully charged capacitors will then discharge through the resistors 24 and the gaseous medium of waveguide 11 which is parallel with resistors 24.

In order to provide for adjustment of the laser resonator in the experimental embodiment the ends of the waveguide 11 were enclosed by dielectric tubes 27 and 28 which terminated in potassium chloride Brewster angle windows 29 and 30 of known type. The laser resonator mirrows were then the adjustable external mirrors 31 and 32 which could be variably aligned along the laser axis to form the resonator through the waveguide 11.

In the operation of the device illustrated in FIGS. 1 and 2 we have found it to have all of the following advantages over conventional transverse discharge gaseous lasers: (1) It operates at lower voltages because of the smaller electrode separation. In our laser electrodes 14 and 15 had a separation of 1 millimeter and thus operated at voltages approximately 25 times less than those for operating a typical conventional transverse discharge laser with an electrode spacing of 25 millimeters. At pressures of about one-half atmosphere we also found that our excitation voltage need not be more than about 1 kilovolt. (2) Gas cooling is enhanced because of the proximity of the walls of the structure to the discharge. (3) Beam deflection and focusing effects are minimized because both the light and the discharge are confined in the waveguide structure. (4) The device is compact. It can be made even more compact by the use of internal mirrors closing the ends of waveguide 11 without tubes 27 and 28 if the device is precisely enough manufactured to provide automatic precision alignment of the mirrors, or to provide merely the amount of alignment permitted by a flexible cement used to attach the mirrors directly to the waveguide device.

We anticipate the possibility of extending operation to pressures of eight atmospheres or greater, although these experiments have not been done. At such pressures the separate oscillation lines would merge to form a frequency continuum and should provide extremely broadband operation. Also picosecond mode-locked pulses should be readily generated in such a laser. Moreover, the excitation pulse repetition rate should be extendable until an essentially continuous train of pulses can be obtained. In fact, we foresee the possibility of continuous wave dc operation at high laser efficiency.

For this early experimental embodiment, the dielectric top plate and cathode electrode stripes 14 were made as follows: a plate of fused quartz 13 was polished to form a flat surface. A 2-micrometer layer of copper was evaporated under this surface over a thin titanium undercoat and then was selectively etched off to leave the stripes 14 which had 1 millimeter square exposed surface in the assembled structure between the the sidewalls 15 and 16.

The operation of the embodiment of FIGS. 1 and 2 was limited to higher order linearly polarized modes by the Brewster angle windows 29 and 30. Pulse repetition rates as high as 100 pulses per second were used and pressures up to about one atmosphere were used.

The following modifications of our experimental study appear feasible. When the dielectric members 13, 15 and 16 are beryllia, its high dielectric constant makes miniaturization of the discharge circuitry possible in the manner shown in FIGS. 3A and 3B by plating a metal coating 33 on the upper surface of dielectric member 13' to form integral discharge capacitors with stripes 14 to replace capacitors 23 of FIG. 2.

Figure 3A:
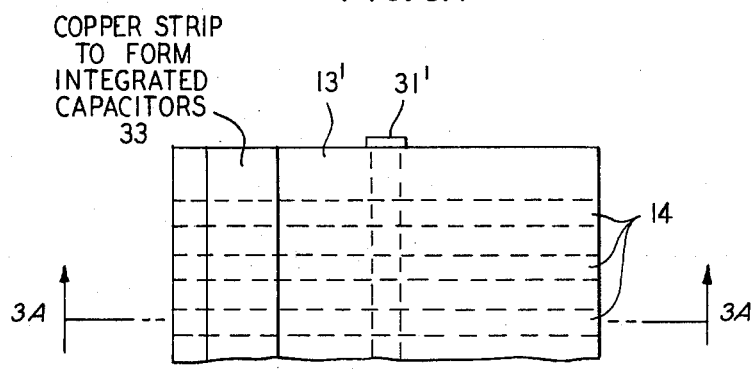
FIGS. 3A and 3B are different views of a pictorial illustration of a modified embodiment in which the pulse-forming capacitors are formed integrally with the laser structure.
Figure 3B:
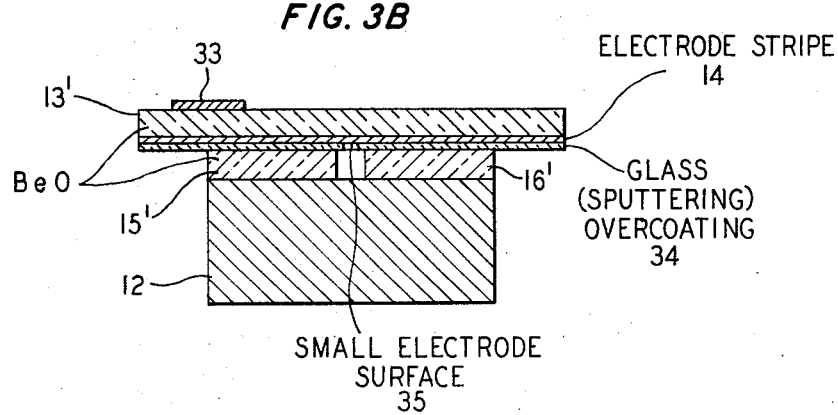

Further as shown in FIG. 3B, to reduce the likelihood that the discharge will concentrate near the sidewalls 15' and 16', an insulating coating 34 of sputtered glass can be placed between electrode stripes 14 and the discharge region and members 15' and 16'. The coating 34 is then etched away to expose a relatively small electrode surface 35 which is operated from the sidewalls 15' and 16' so that the discharge must spread out from this relatively small discharge area toward the anode 12. Such a sputtered glass layer can also be used with the fused quartz design in FIGS. 1 and 2.

Figure 4:
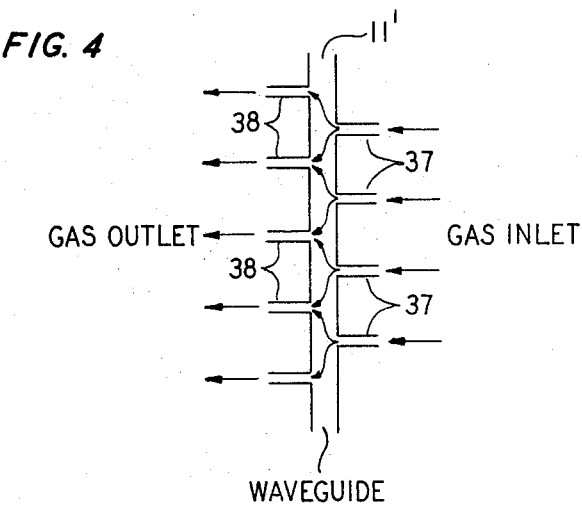
FIG. 4 is a pictorial illustration of a general layout for multiple gas inlets and outlets in the embodiments of the invention.

In addition as shown in FIG. 4 the waveguide and discharge region 11' can be provided with reduced gas pressure drop in a flowing system by the multiple inlet ports 37 which are staggered with respect to multiple outlet ports 38 as indicated schematically. In actual practice the inlet ports 37 and the outlet ports 38 can alternate along the laser axis while entering the discharge region 11' in the same direction through anode 12. The diagrammatic showing of FIG. 4 is merely useful in helping to understand the nature of the gas flow for such multiple ports. Such multiple ports make it possible that the laser structure may be as long as desired.

The capacitor charging resistors 24 can also be made by thin metal coatings on the top slab 13' just as was the capacitive coatings 33 of FIG. 3A. Such coating could be provided on an extension (not shown) of the top plate beyond the exposed ends of electrode stripes 14 to which electrical connections are made.

The further improvements of our laser envisioned by us relate most importantly to pre-ionization techniques intended to improve the uniformity of the discharge along the laser axis.

Figure 5:
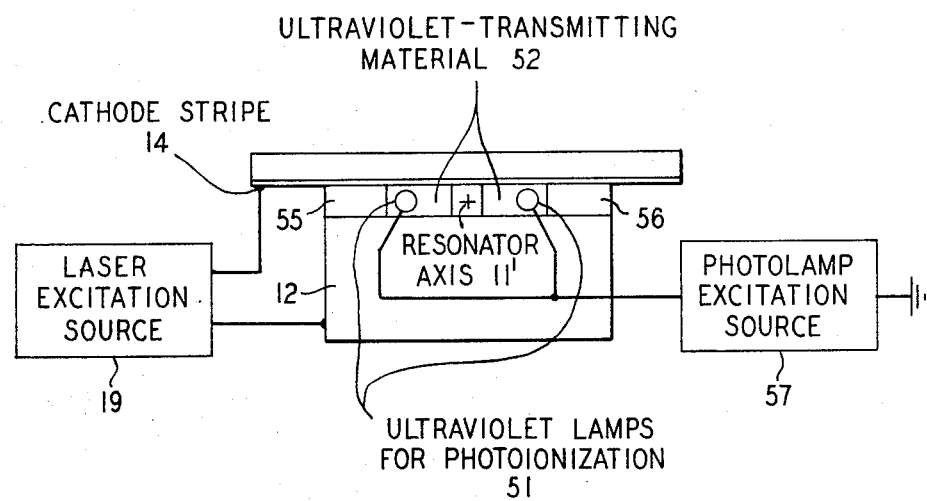
FIG. 5 is a partially pictorial and partially block diagrammatic illustration of a modified embodiment of the invention employing a photoionization technique.

The first of such pre-ionization techniques is shown in FIG. 5 and employs ultraviolet lamps 51 to photoionize the gaseous medium. The lamps 51 are contained within the ultraviolet transmitting material 52 between the sidewalls 55 and 56 of beryllia and the discharge region 11''. Such ultraviolet lamps 51 typically contain a medium such as mercury vapor exited through a conventional electrode structure (not shown) by means of a photo lamp excitation source 57. This source 57 is preferably separate from the laser axis source 19.

Figure 6:
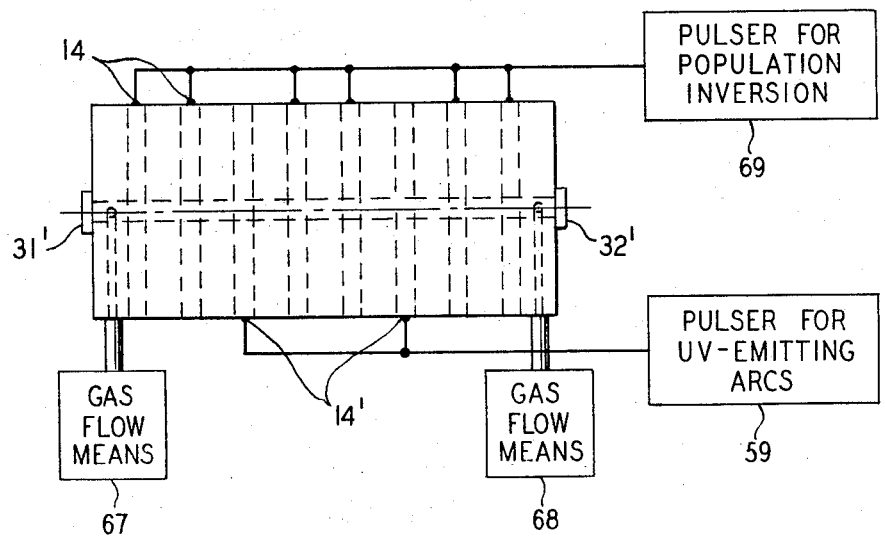
FIG. 6 is a partially pictorial and partially block diagrammatic plan view of the embodiment of FIG. 5.

The same sort of photoionization technique can be provided in a slightly modified embodiment as shown in the plan view of FIG. 6. Instead of lamps 51 the ultraviolet sources are provided by connecting a few of the electrode stripes 14' to a pulse source 59 which is timed to provide pulses slightly ahead of the pulses from source 19' which produces the population inversion in the gaseous medium. Pulser 59 is designed so that bright arcs occur from electrode 14' to the base anode 12. Such bright arcs emit a substantial amount of ultraviolet light which propagates down the length of the medium and photoionizes it before the pulses from pulser 19'.

Figure 7A:
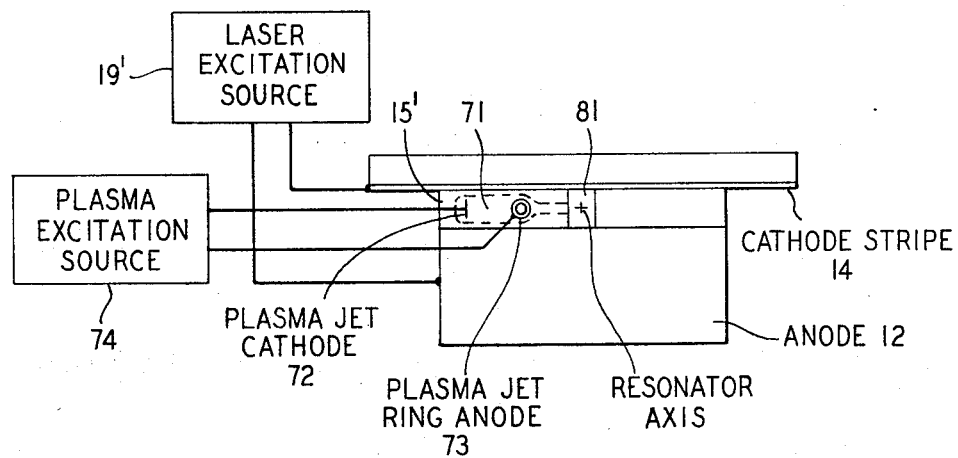
FIGS. 7A and 7B are partially pictorial and partially block diagrammatic illustrations of a preionization technique employing plasma-jets.
Figure 7B:
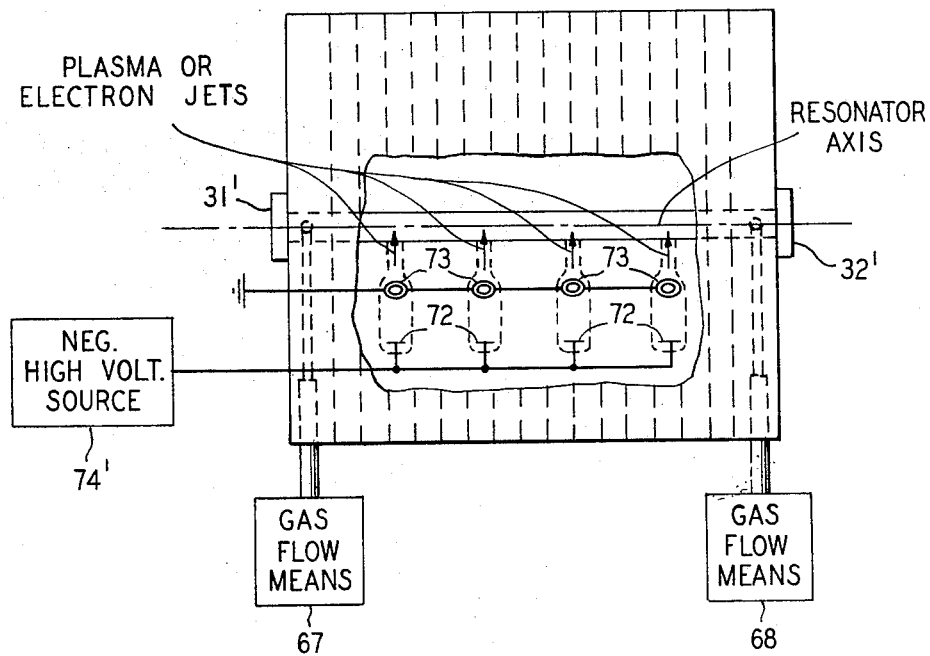

Alternatively, pre-ionization can be provided by plasma-jets or electron jets as shown in the embodiment of FIGS. 7A and 7B. The key to this concept is to embed the plasma-jet unit into one beryllia sidewall 15'. Each of the plasma-jet units comprises a hollow cavity 71 which is necked down as it enters the discharge space 81 and includes the cathode jet anode 72 and ring-type anode 73 adjacent to and encircling a major portion of passageway leading to discharge region 81. In other words, anode 73 is between cathode 72 and the discharge region 81. The plasma pulse excitation voltage is applied from an excitation source 74 between cathode 72 and anode 73 with a slight lead time over the pulse from the laser excitation source 19' so that plasma enters the medium in discharge region 81 before the power is applied to produce the population inversion therein. In both FIGS. 7A and 7B the ring anodes 73 are shown turned out of normal perspective so that their ring-like structure can be seen.

For a continuous excitation laser or for structures in which timing problems are desired to be avoided continuous plasma streams can be provided through the plasma-jets simply by connecting the cathodes 72 to a negative high voltage source 74' while the anodes 73 are grounded. Typically, the timing of the pulsed version would be that the high negative voltage would be applied to cathodes 72 a few microseconds prior to the initiation of the transverse discharge.

Many other modifications and variations of the proposed embodiment are possible within the spirit and scope of our invention. For example, nuclear preionization may be feasible by coating portions of the sidewalls with an alpha particle emitter such as any of several known low-level long-lived radioactive materials. It is believed the shielding provided by the dielectric sidewalls, top plate and electrodes would provide sufficient shielding for nearby personnel.

We claim:

1. A gas laser of the type including a bore of transverse dimension suitable for waveguiding of selected laser radiation, a gas suitable for supplying said radiation, means for resonating said radiation along said bore, and means for establishing a discharge in said gas in said bore to provide a population inversion in said gas, characterized in that said discharge establishing means comprises an anode having a smooth surface running along said bore and forming a wall thereof, an opposing dielectric wall of said bore, and a plurality of cathode structures disposed on said dielectric wall and having surfaces parallel to said anode surface, whereby said anode and said cathode structures participate in the waveguiding of the laser radiation.

2. A gas laser of the type claimed in claim 1 in which a bore of rectangular cross-section is provided, said laser including dielectric plates separating said anode surface and the opposing dielectric wall and having surfaces adjacent the gas and essentially orthogonal to said dielectric wall.

3. A gas laser of the type claimed in claim 2 in which the thickness of the dielectric plates is of the order of 1 millimeter and their separation is of the order of 1 millimeter.

4. A gas laser of the type claimed in claim 1 including in cooperation with the cathode structures and the dielectric wall a plurality of integrated capacitors comprising an electrode plated on a surface of the dielectric wall essentially uniformly spaced from said cathode structures and extending over like portions of all of said plurality of said cathode structures.

5. A gas laser of the type claimed in claim 2 in which the cathode structures are separated from the dielectric plates by means of a sputtered dielectric film therebetween producing a separation of discharge space from said plates.

6. A gas laser of the type claimed in claim 1 in which the anode includes a plurality of gas inlets and a plurality of gas outlets to said bore, said inlets and said outlets being disposed alternately along the length of said bore.

7. A gas laser of the type claimed in claim 1 including a plurality of discrete means for pre-ionizing the gas medium in said bore.

8. A gas laser of the type claimed in claim 7 in which the plurality of discrete pre-ionizing means include a plurality of ultraviolet lamps arranged to illuminate the gas within said bore and means for energizing said lamps.

9. A gas laser of the type claimed in claim 7 in which the plurality of discrete pre-ionizing means comprises a plurality of arc forming circuits disposed to form arcs within the gas within the bore.

10. A gas laser of the type claimed in claim 7 in which the plurality of discrete pre-ionizing means include a plurality of cavities in one dielectric member forming a wall of said bore, a cathode within each cavity, and a ring-type anode in each cavity between the cathode and the bore, said laser including means for generating an ionizing voltage between the plurality of respective pairs of cathodes and anodes, whereby a plasma passes through the ring-type anodes into the gas within the bore.

* * * * *